May 22, 1951

E. BROOKER 2,553,700

BAGEL CLAMP

Filed July 1, 1949

INVENTOR.
ERWIN BROOKER
BY
Brockman & Schnurmacher
ATTORNEYS

Patented May 22, 1951

2,553,700

UNITED STATES PATENT OFFICE 2,553,700

BAGEL CLAMP

Erwin Brooker, Shaker Heights, Ohio

Application July 1, 1949, Serial No. 102,669

1 Claim. (Cl. 146—216)

This invention relates to food holding devices and particularly to a clamp for holding torus-shaped baked goods while they are being sliced.

Conducive to a better understanding of this invention, it may be well to point out that a certain type of pretzel roll having a ring or torus-shape and also known as a "bagel" is baked with a very hard outer crust.

In order to be eaten the bagel is broken apart or cut in half. However, due to its hard smooth outer surface, the roll is practically incompressable and when held on edge for cutting is likely to slide or skid sideways, making it difficult to cut and endangering the fingers.

The primary object of this invention therefore is to provide a clamping device which will hold a bagel or similar torus-shaped baked goods immoveably on edge while it is being cut.

A further object is to provide a device of the type stated which can be operated by one hand leaving the other hand free to hold the knife used to cut the clamped bagel.

Other objects of the invention are to provide a bagel clamp of the character described which will be comparatively simple in construction, strong, durable and reliable in use and which may be manufactured at a low cost.

These and other objects of the invention will become apparent from a reading of the following specification and claim together with the accompanying drawing wherein:

Figure 1:
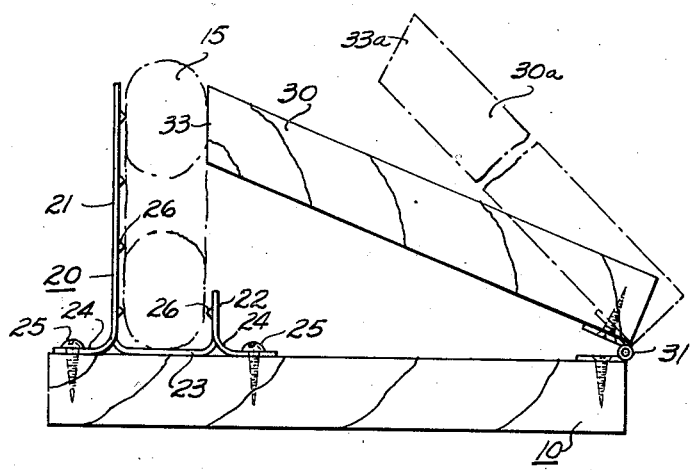
Figure 1 is a side elevation of the clamp showing a bagel positioned on edge between the walls of the fixed jaw with its face engaged by the clamping shoe.

Referring to the drawing, there is shown a bagel clamp made in accordance with the invention. The device consists broadly of three elements or members; the base, the fixed jaw and the moveable arm.

Each of these members are broadly indicated by the reference characters 10, 20 and 30 and will be disclosed in detail in the order stated.

The base 10 consists of a rectangularly shaped block of wood, plastic or metal having sufficient rigidity and strength for the purpose. In its preferred form the base has a plane upper surface upon which are mounted the jaw 20 and the arm 30 as shown in the Figures 1 and 2.

The jaw 20 is preferably made from a single piece of non-corrosive sheet metal such as copper, stainless steel or aluminum of a gage calculated to impart the required rigidity to the formed jaw.

The jaw 20 is U-shaped in cross-section with a high wall 21, a low wall 22 and a horizontal bed 23 connecting and spacing the walls. The distance between the jaw walls 21 and 22 should be sufficient to admit the thickest bagel likely to be encountered since the walls cannot be moved apart once the jaw is formed. The outer ends of the bed 23 are slitted and bent outward to form the mounting feet 24. The jaw 20 is mounted on the base 10 by means of suitable wood screws 25, which pass through the feet 24. The mounted U-shaped jaw 20 rests on its bed 23 with its high and low walls 21 and 22 respectively extending vertically as shown.

Reference character 26 indicates a plurality of spaced pointed projections punched in the face of the walls 21 and 22. An arm 30 is hingedly mounted on the base 10 in spaced relation with the jaw 20 on the side of the low wall 22 as shown in the Figures 1 and 2. The arm is mounted on the base by means of a hingle 31 located at the extreme end of the arm. The arm 20 is preferably rectangular in shape and cross-section so that its upper and side surfaces may serve as gripping areas for the hand operating the device. The length of the arm 30 should be such that the free end of the arm will extend about one-half way between the low wall 22 and the high wall 21 of the jaw 20 when the arm 30 is in its lowered position. The end of the arm 30 opposite the hinge 31 is cut at an acute angle to the upper surface of the arm 30 to form the clamping surface or shoe 33.

In using the clamp to hold a bagel in position for slicing, the arm 30 is swung back on its hinge 31 to the alternate position indicated by the reference character 30a.

Figure 2:
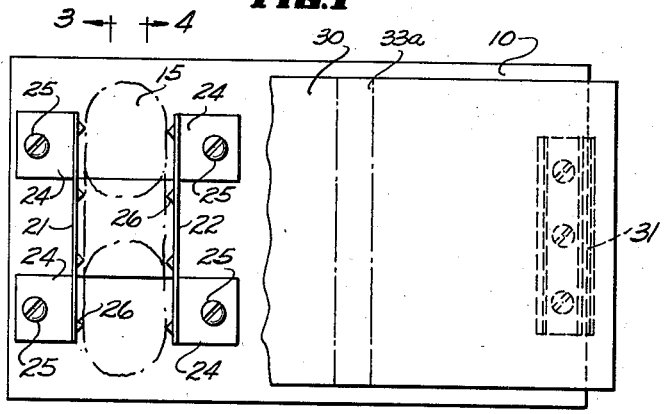
Figure 2 is a top plan view of the same.
Figure 3:
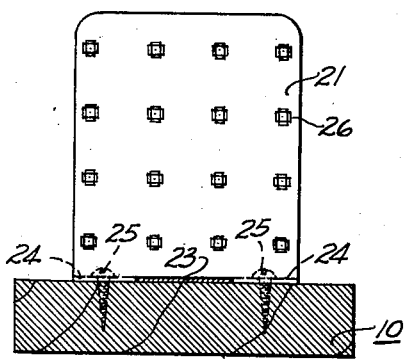
Figure 3 is a cross-sectional view taken along the line and in the direction of the arrows 3—3 of the Figure 1.
Figure 4:
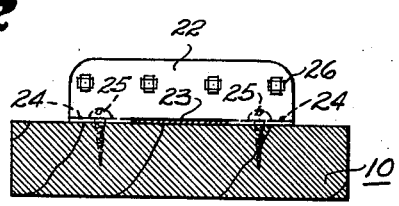
Figure 4 is a cross-sectional view taken along the line and in the direction of the arrows 4—4 of the Figure 1.

A bagel 15 is placed on edge between the jaw walls 21 and 22 as shown in the Figures 1 and 2. The arm 30 is then swung toward the jaw 20 until the shoe 33 engages the face of the bagel 15 above the low wall 22 of the fixed jaw 20. Pressure on the top of the arm 30 will then cause the shoe 33 to press against the bagel 15 thereby wedging it against the walls of the fixed jaw 20. The pointed projections 26 penetrate the crust of the bagel slightly due to the clamping pressure exerted by the shoe 33 and prevent the bagel from moving longitudinally of the jaw under the slicing action of the knife. The clamped bagel can thus be easily, safely and accurately sliced in half by means of a knife held in the free hand of the operator.

It will now be clear that there is provided a device which accomplishes the objectives heretofore set forth. While the invention has been disclosed in its preferred form; it is to be understood that the specific embodiment thereof as described and illustrated herein is not to be considered in a limited sense as there may be other forms or modifications of the invention which should also be construed to come within the scope of the appended claim.

I claim:

A clamp for holding a bagel or similar torus-shaped baked goods on edge, comprising in combination, a base member, a J-shaped jaw member vertically mounted on the base member, the facing surfaces of said jaw having a plurality of pointed projections adapted to engage an object positioned therebetween, and an arm member including a shoe portion hingedly mounted about a horizontal axis on the said base in spaced relation with the said jaw member on the lower side thereof, the said shoe portion being arcuately movable toward the high side and above the low side to engage the face of a bagel positioned on edge between the aforesaid jaw sides.

ERWIN BROOKER.

REFERENCES CITED

The following references are of record in the file of this patent:

UNITED STATES PATENTS

| Number | Name | Date |
|---|---|---|
| 1,977,462 | Van Berkel | Oct. 16, 1934 |

FOREIGN PATENTS

| Number | Country | Date |
|---|---|---|
| 161,785 | Great Britain | Dec. 15, 1920 |